United States Patent Office 3,494,948
Patented Feb. 10, 1970

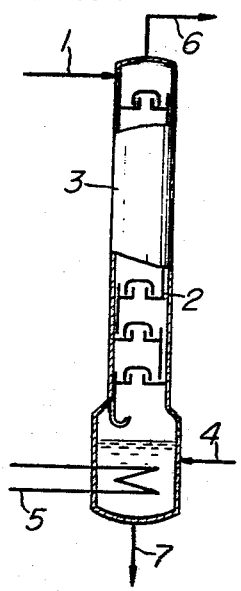
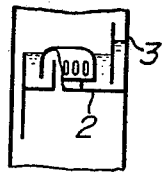
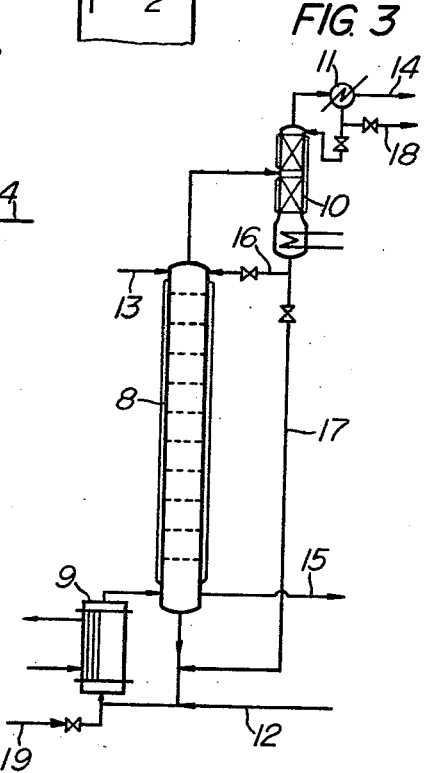

3,494,948
PROCESS FOR PRODUCING HIGHER ALKYLALUMINUMS
Eiichi Ichiki, Akira Yashima, and Michio Kozai, Niihama-shi, Japan, assignors to Sumitomo Chemical Company, Ltd., Osaka, Japan, a corporation of Japan
Filed Dec. 14, 1966, Ser. No. 601,755
Claims priority, application Japan, Dec. 21, 1965, 40/79,073
Int. Cl. C07f 5/06
U.S. Cl. 260—448                          7 Claims

ABSTRACT OF THE DISCLOSURE

The subject matter of this invention involves a process for producing higher alkylaluminum by the displacement reaction of alkylaluminum having at least one isobutyl radical represented by the general formula $$Al(i\ C_4H_9)_{3-m-n}R_mH_n$$

wherein R is a hydrocarbon radical of the formula —$CH_2$—$CHR_1R_2$, where $R_1$ and $R_2$ are, respectively, one member selected from the group consisting of aliphatic hydrocarbon radicals and hydrogen radicals, the total number of carbon atoms of $R_1$ and $R_2$ being 3 to 20; $m$ is 2, 1 or 0; and $n$ is 1 or 0, the sum of $m$ and $n$ being not more than 2, with higher α-olefins represented by the general formula $$CH_2=CR_3R_4$$

wherein $R_3$ and $R_4$ are, respectively, one member selected from the group consisting of aliphatic hydrocarbon radicals and hydrogen radicals, the total number of carbon atoms of $R_3$ and $R_4$ being 3 to 20, characterized in that a liquid alkylaluminum having an isobutyl radical is fed through the top, while a higher α-olefin through the bottom, of a plate tower provided with a heater at the bottom; the tower bottom is maintained at 70°–200° C. to vaporize the higher α-olefin as well as to effect the countercurrent and continuous displacement reaction of the liquid alkylaluminum descending the tower from the top with the higher α-olefin in the form of vapor; and the resulting higher alkylaluminum is withdrawn through the lower part of the plate tower while unreacted higher α-olefin-containing isobutylene is withdrawn through the top of the tower.

---

This invention relates to a process for producing alkylaluminums having higher alkyl radicals by the reaction of alkylaluminums and higher α-olefins (hereinafter referred to as displacement reaction).

It is well known that a higher alkylaluminum can be obtained by reacting triisobutylaluminum or an alkylaluminum having an isobutyl radical with a higher α-olefin, thereby bringing about the displacement of alkyl radical to separate isobutylene (refer to, for example, "Annalen der Chemie," vol. 629, p. 14 (1960); United States Patent 2,835,689 (1958)).

For such displacement reaction, there has heretofore been adopted a process carried out by charging into a reactor an alkylaluminum having an isobutyl radical and a higher α-olefin each in a definite amount, heating the mixture to 70°–180° C., cooling the generated vapor by means of a reflux condenser and taking out the formed isobutylene gas while returning the α-olefin back into the system. The above reactions may be represented as follows:

$$\text{al i } C_4H_9 \rightleftarrows \text{al } H + i\ C_4H_8 \quad (1)$$
$$\text{al } H + R' \rightleftarrows \text{al } R \quad (2)$$

wherein al i $C_4H_9$ is an Al–i $C_4H_9$ bond in the alkyluminum; $i$ represents iso; alH is an Al—H bond; R' is the higher olefin; and R is an alkyl radical corresponding to R'.

The above two reactions are reversible reactions, and the equilibrium constant of each equation, of course, differs depending on the molecular structure of R'. However, in case there is employed a reaction mode in which the $iC_4H_8$ gas is discharged out of the system regardless of the difference in equilibrium constant, alH successively reacts with R' to essentially complete the main reaction represented by the equation $$\text{al i } C_4H_9 + R' \rightarrow \text{al } R + i\ C_4H_8 \quad (3)$$

In order to avoid effecting the reaction in the presence of a great excess of higher α-olefin, isobutylene in the reaction system should be excluded as the reaction progresses to lower the concentration as far as possible. The conventional process as mentioned above has suffered from such drawback that as the concentration of the isobutyl radical in the alkylaluminum lowers due to progress of the reaction, the exclusion of isobutylene from the reaction system becomes difficult, whereby the concentration of isobutylene in the vapor generated from the system is quickly lowered. That is, according to the above-mentioned conventional process, an enormous amount of higher α-olefin or solvent has been required to be vaporized for the exclusion of isobutylene.

An object of the present invention is to provide a process in which a plate tower is used as the reactor to overcome the disadvantages of the conventional process as well as to effect the displacement reaction continuously and efficiently with a minimum amount of heat.

Other objects will become apparent from the description that follows.

In the accompanying drawings, FIGS. 1 and 3 show examples of apparatuses suitable for practice of the present invention, and FIG. 2 is an enlarged view of an example of the plates employed in said apparatuses.

The present process will be illustrated below with reference to FIG. 1 which shows an example of modes of practice of the present invention.

Liquid alkylaluminum having an isobutyl radical is fed through a conduit 1 to the top of a plate tower 3 provided with plates 2 and, at the bottom, with a heater 5. On the other hand, a higher α-olefin is fed through a line 4 to the lower part of the tower 3. The higher α-olefin vaporized by heating with the heater 5, ascends, while accompanying an isobutylene gas formed by the reaction, to contact with the liquid alkylaluminum on the lowest plate, and further ascends to the upper plates while effecting displacement reaction. Therefore, the liquid alkylaluminum becomes lower in isobutyl radical content, as it descends to the lower plates, and the higher α-olefin vapor ascending from the lower plate advances to the upper plates while being increased in isobutylene content. Consequently, the vapor finally contacts with the starting isobutyl radical-containing alkylaluminum fed through the line 1 to become a vapor so high in isobutylene gas content as to be substantially equilibrium to alkylaluminum fed thereto, and leaves the tower through a line 6. The isobutyl radical-containing liquid alkylaluminum fed through the line 1 contacts, as it descends the tower to the bottom, with the higher α-olefin successively lowered in isobutylene content, is brought into a state advanced in displacement reaction, and is finally withdrawn out of the system through a line 7 as a substantially isobutyl radical-free higher alkylaluminum.

Thus, in accordance with the process of the present invention, the alkylaluminum is thoroughly agitated on each plate with the higher α-olefin and, moreover, since the reaction is a counter-current reaction, the displacement reaction is effected continuously and effectively. Therefore, the reaction can be performed without requiring a great excess of higher α-olefin and with a less amount of heat.

The alkylaluminums employed in the present invention are those having at least one isobutyl radical which are represented by the general formula $$Al(iC_4H_9)_{3-m-n}R_mH_n$$

wherein R is a hydrocarbon radical of the formula $$-CH_2-CHR_1R_2$$

wherein $R_1$ and $R_2$ are, respectively, one member selected from the group consisting of aliphatic hydrocarbon radicals and hydrogen radicals, the total number of carbon atoms of $R_1$ and $R_2$ being 3 to 20; $m$ is 2, 1 or 0; and $n$ is 1 or 0, the sum of $m$ and $n$ being not more than 2. Examples of such alkylaluminums are triisobutylaluminum, diisobutylaluminum hydride, isobutyldi-2-ethylhexylaluminum, diisobutyl-2-ethylhexylaluminum and isobutyl-2-ethylhexylaluminum hydride. These may be used either alone or in admixture. The higher α-olefins employed in the present invention are those represented by the general formula $$CH_2=CR_3R_4$$

wherein $R_3$ and $R_4$ are, respectively, one member selected from the group consisting of aliphatic hydrocarbon radicals and hydrogen radicals, the total number of carbon atoms of $R_3$ and $R_4$ being 3 to 20. Examples of such higher α-olefins are n-hexene-1,2-methylhexylene-1, 2-n-octene-1, 2-ethylhexene-1, 2-ethylpentene-1, methyloctene-1, n-decene-1, n-dodecene-1, n-octadecene-1 and n-eicosene-1. These may be used either alone or in admixture.

The reaction of such starting alkylaluminum with an olefin results in an alkylaluminum having the following formula:

$$Al(-CH_2-CR_3R_4)_{3-m-n}R_mH_n$$

wherein R, $m$ and $n$ have the same meanings as those in the general formula for the starting alkylaluminum, and $R_3$ and $R_4$ have the same meanings as those in the general formula for the starting olefin. Therefore, when a mixture of olefins is used, an alkylaluminum having alkyl radicals corresponding to the olefin mixture is obtained. Such an alkylaluminum product includes tri-2-ethylhexylaluminum, di - 2 - ethylhexyl-2-ethylpentylaluminum, 2-methylhexyl-2-ethylhexylaluminum hydride and the like.

In the practice of the present invention, the feed ratio of higher α-olefins to isobutyl radical-containing alkylaluminums varies depending on the amounts of isobutyl radical and hydrogen atom present in the starting alkylaluminums. The amount of higher α-olefin may be at least 80% of the theoretical amount based on the total amount of isobutyl radical and hydrogen atom in the starting alkylaluminum. The theoretical amount means the following: One equivalent of isobutyl radical present in a starting alkylaluminum brings about a displacement reaction with one equivalent of higher α-olefin, and one equivalent of higher α-olefin adds to one equivalent of hydrogen atom. For example, in case tri-n-octylaluminum is produced from triisobutylaluminum (3-equivalents of isobutyl radical is present in one mole) or diisobutylaluminum hydride (one equivalent of hydrogen atom and 2 equivalents of isobutyl radical are present in one mole) and n-octene-1, the theoretical amount of n-octene-1 is 3 moles per mole of triisobutylaluminum or diisobutylaluminum hydride.

In case the amount of higher α-olefin is smaller than the theoretical amount, a smaller amount of dialkylaluminum hydride is contained in the product. However, when higher α-olefin is added thereto, trialkylaluminum can be easily obtained. In case the amount of higher α-olefin becomes less than 80% of the theoretical amount, not only the amount of dialkylaluminum hydride greatly increases, but the amount of isobutyl radical left in the resulting higher alkylaluminum undesirably increases.

The temperature, suitable for practicing the present invention, of the heater at the tower bottom is in the range of from 70° to 200° C., preferably from 120° to 180° C. At below 70° C., the reaction rate is low, while at above 200° C., the thermal decomposition of alkylaluminum undesirably initiates to occur. At temperatures within said range at atmospheric pressure, most of higher α-olefins are maintained in a vapor form. In case the boiling point of higher α-olefin is high, the reaction zone may be maintained at a suitable temperature by reducing the pressure in the apparatus, while in case the boiling point is low, the reaction may be carried out under presure. Alternatively, the partial pressure of higher α-olefin may be lowered by introducing through the bottom of the plate tower a gas inert to alkylaluminum and higher α-olefin, such as isobutane, n-butane, n-hexane, n-heptane, isooctane, nitrogen gas or hydrogen gas. In case unreacted higher α-olefin is left in isobutylene leaving the plate tower through the top, the higher α-olefin is desirably recycled to the plate tower after separation from isobutylene. The higher α-olefin to be recycled may be introduced through any of the top or bottom of the plate tower. The recycled higher α-olefin effectively increases the higher α-olefin concentration in the reaction zone to enhance the action of stripping isobutylene out of the isobutyl radical-containing alkylaluminum.

The heater at the plate tower bottom may be any of the type directly connected to the tower, as seen in FIG. 1, or the reboiler type as seen in FIG. 3. Plates usable in the plate tower of the present invention include bubble cap plates, perforated plates and those made by modifying or improving said plates. Particularly, an apparatus having stable liquid hold-up represented by the bubble cap plate among said plates is easy in operation and gives a stable conversion. In case a single plate is used, no substantial effect can be attained, and the use of at least 2 plates is necessary. The number of plates may be decided according to chemical engineering procedures employed for the calculation of reaction rate in the liquid phase and distillation.

Now, the present invention will be fully illustrated below with reference to examples, in each of which the amount of isobutyl radical left in the resulting alkylaluminum is represented by the percentage of the equivalent number of residual total isobutyl radical based on the equivalent number of the resulting alkylaluminum (1 mole of alkylaluminum corresponds to 3 equivalents).

EXAMPLE 1

In this example was used a plate tower, in which an iron-made tower of 20 cm. in inner diameter and 3.8 m. in length was provided with 10 plates at intervals of 30 cm., each plate having 4 small bubble caps, and which was so designed that when a liquid had been filled to the top of weir, the static liquid hold-up per plate became about 1.0 l. (refer to FIG. 3). The plate tower 8 was thermally insulated to prevent heat loss on the tower surface, and a tube-nest type reboiler was used as the heater 9 at the tower bottom. Further, the tower was provided with a distillation tower 10 in order to separate the vapor from the tower top into higher α-olefin and isobutylene and to recycle the higher α-olefin into the system, and the cooler 11 annexed to the distillation tower was cooled with brine to −20° C. in order to condense the isobutylene.

In the first place, the whole apparatus including the plate tower 8 was pre-dried and the atmospere was thoroughly substituted by nitrogen gas. Thereafter, all the bubble plate caps were filled with a liquid layer of water-free 2-ethylhexene-1. Since line 19 was not used, the valve was in a closed state. After completion of such preliminary operations, a 98% purity diisobutylaluminum hydride was fed through line 13, and 2-ethylhexene-1 was fed through line 12 while maintaining the tower bottom temperature at 155° C. by means of the heater 9.

Even after the escape of nitrogen gas, the outlet 14 was not closed and the operation was effected at atmospheric pressure, and the product higher alkylaluminum was withdrawn through line 15 so as to maintain to a definite level the surface of the liquid at the bottom of the plate tower, while the separated isobutylene was withdrawn through line 18.

When the reaction had reached a steady state according to the above operation, the amounts of isobutylaluminum hydride fed through line 13 and of 2-ethylhexene-1 fed through line 12 were controlled to 400 g./hr. and 1100 g./hr., respectively. Further, the amounts of 2-ethylhexene-1 recycled through line 16 and line 17 were controlled to about 1100 g./hr. and about 900 g./hr., respectively. The amount of isobutylene flowing out through line 18 after the reaction had reached a steady state was 300 g./hr. On the other hand, 2-ethylhexene-1 was removed from the reaction product withdrawn through line 15 to obtain 1010 g./hr. of a mixture of tri-2-ethylhexylaluminum and di-2-ethylhexylaluminum hydride. The thus obtained product was analyzed to find that it contained not more than 4 equivalent percent of isobutyl radical. Further, the aluminum content of the product obtained in a unit time was measured to find that it was substantially equal to the aluminum content of diisobutylaluminum hydride fed in a unit time.

EXAMPLE 2

The same pretreatment as in Example 1 was effected in the apparatus employed in Example 1, using n-decene-1 as higher α-olefin. Thereafter, 99% purity triisobutylaluminum was fed through line 13 and n-decene-1 through line 12. The plate tower was evacuated through line 14, and the tower top pressure was maintained under an absolute pressure of 400 mm. Hg. Reaction was continued while injecting a dry nitrogen gas through line 19 at the bottom of the plate tower. The cooler 11 was cooled to −10° C., but no withdrawal of isobutylene through line 18 was effected, because isobutylene accompanied with the nitrogen gas had left the system through line 14, and no heating of the bottom of the distillation tower was effected. On the other hand, n-decene-1 leaving the distillation column through the bottom was returned to the top of the plate tower. After the reaction had reached a steady state according to the above operations, the amounts of triisobutylaluminum fed through line 13, n-decene-1 fed through line 12 and nitrogen gas fed through line 19 were controlled to 500 g./hr., 1100 g./hr. and 160 l./hr. In this case, the amount of n-decene-1 refluxed through line 16 was about 1000 g./hr. After the reaction had reached a steady state, the reaction product was withdrawn through line 15 while maintaining at a definite level the surface of the liquid at the bottom of the plate tower. The reaction product was freed from dissolved n-decene-1 to obtain 1030 g./hr. of a liquid product. This liquid product was analyzed to find that substantially all of the product was tridecylaluminum and not more than 0.7 equivalent percent of isobutyl radical was contained in the product.

What is claimed is:
1. A process for producing higher alkylaluminum by the displacement reaction of alkylaluminum having at least one isobutyl radical represented by the general formula

$$Al(i\text{-}C_4H_9)_{3-m-n}R_mH_n$$

wherein R is a hydrocarbon radical of the formula $$-CH_2-CHR_1R_2$$

where $R_1$ and $R_2$ are, respectively, one member selected from the group consisting of aliphatic hydrocarbon radicals and hydrogen radicals, the total number of carbon atoms of $R_1$ and $R_2$ being 3 to 20; $m$ is 2, 1 or 0; and $n$ is 1 or 0, the sum of $m$ and $n$ being not more than 2, with higher α-olefins represented by the general formula $$CH_2=CR_3R_4$$

wherein $R_3$ and $R_4$ are, respectively, one member selected from the group consisting of aliphatic hydrocarbon radicals and hydrogen radicals, the total number of carbon atoms of $R_3$ and $R_4$ being 3 to 20, characterized in that a liquid alkylaluminum having an isobutyl radical is fed through the top, while a higher α-olefin through the bottom, of a plate tower provided with a heater at the bottom; the tower bottom is maintained at 70°–200° C. to vaporize the higher α-olefin as well as to effect the countercurrent and continuous displacement reaction of the liquid alkylaluminum descending the tower from the top with the higher α-olefin in the form of vapor; and the resulting higher alkylaluminum is withdrawn through the lower part of the plate tower while unreacted higher α-olefin-containing isobutylene is withdrawn through the top of the tower.

2. A process according to claim 1, wherein the tower bottom is maintained at 120°–180° C.

3. A process according to claim 1, wherein the alkylaluminum having at least one isobutyl radical is a member selected from the group consisting of triisobutylaluminum, diisobutylaluminum hydride, isobutyl-di-2-ethylhexylaluminum, diisobutyl-2-ethylhexylaluminum and isobutyl-2-ethylhexylaluminum hydride.

4. A process according to claim 1, wherein the higher α-olefin is a member selected from the group consisting of n-hexene-1, 2-methylhexene-1, n-octene-1, 2-ethylhexene-1, 2-ethylpentene-1, 2-methyloctene-1, n-decene-1, n-dodecene-1, n-octadecene-1, and n-eicosene-1.

5. A process according to claim 1, wherein an inert gas is introduced through the lower part of the plate tower.

6. A process according to claim 5, wherein the inert gas is selected from the group consisting of isobutane, n-butane, n-hexane, n-heptane, isooctane, nitrogen and hydrogen.

7. A process according to claim 1, wherein unreacted higher α-olefin is separated from the isobutylene withdrawn through the top of the plate tower and is recycled to the plate tower.

References Cited

UNITED STATES PATENTS

| 2,835,689 | 5/1958 | Ziegler et al. |
| 3,014,941 | 12/1961 | Walsh. |
| 3,038,922 | 6/1962 | Snyder. |
| 3,180,881 | 4/1965 | Zosel et al. |
| 3,210,435 | 10/1965 | Kennedy et al. |
| 3,389,161 | 6/1968 | Kottong et al. |

OSCAR R. VERTIZ, Primary Examiner

H. M. S. SNEED, Assistant Examiner